(12) United States Patent
Hickey et al.

(10) Patent No.: US 10,107,960 B2
(45) Date of Patent: Oct. 23, 2018

(54) OPTICAL COUPLER WITH A WAVEGUIDE AND WAVEGUIDE INDEX MATCHED MATERIALS AT AN EDGE OF A SUBSTRATE

(71) Applicant: RANOVUS INC., Ottawa (CA)

(72) Inventors: Ryan Murray Hickey, Stittsville (CA); Christopher James Brooks, Nepean (CA); Dylan Logan, Ottawa (CA); Andrew Peter Knights, Dundas (CA)

(73) Assignee: RANOVUS INC., Ottawa, Ontario (CA)

( * ) Notice: Subject to any disclaimer, the term of this patent is extended or adjusted under 35 U.S.C. 154(b) by 0 days.

(21) Appl. No.: 15/699,324

(22) Filed: Sep. 8, 2017

(65) Prior Publication Data

US 2018/0074259 A1    Mar. 15, 2018

Related U.S. Application Data

(60) Provisional application No. 62/385,568, filed on Sep. 9, 2016.

(51) Int. Cl.
 *G02B 6/12*  (2006.01)
 *G02B 6/122* (2006.01)
 *G02B 6/136* (2006.01)

(52) U.S. Cl.
 CPC ......... *G02B 6/1221* (2013.01); *G02B 6/1228* (2013.01); *G02B 6/136* (2013.01); *G02B 2006/12061* (2013.01); *G02B 2006/12073* (2013.01); *G02B 2006/12176* (2013.01)

(58) Field of Classification Search
 CPC .................................................. G02B 6/12016
 See application file for complete search history.

(56) References Cited

U.S. PATENT DOCUMENTS

| 3,994,559 | A  | * | 11/1976 | Crow  | G02B 6/30 385/130 |
|---|---|---|---|---|---|
| 4,526,711 | A  |   | 7/1985  | Sacher et al. | |
| 7,076,135 | B2 |   | 7/2006  | Yamada et al. | |
| 8,326,100 | B2 |   | 12/2012 | Chen et al.   | |
| 9,588,298 | B2 |   | 3/2017  | Novack et al. | |

(Continued)

OTHER PUBLICATIONS

International Search Report, dated Jan. 8, 2018, by ISA/CA, re PCT International Application No. PCT/IB2017/055443.

(Continued)

*Primary Examiner* — Chris Chu
(74) *Attorney, Agent, or Firm* — Perry + Currier, Inc.

(57) ABSTRACT

A device that includes an optical coupler with a waveguide and waveguide index matched materials at an edge of a substrate, and a method of forming the device, is provided herein. The device comprises: a substrate having an edge, and an opening formed therein adjacent the edge; a layer of insulator on the substrate, which forms a bridge across the opening at the edge; a waveguide on the layer of insulator, the waveguide comprising a constant-width region and a tapered region terminating at the edge in a region of the opening; a first layer of optical epoxy in the opening, the optical epoxy indexed matched to the layer of insulator; and, a second layer of the optical epoxy on the tapered region, such that the optical epoxy optically contains an optical signal leaking from the waveguide in the tapered region.

20 Claims, 8 Drawing Sheets

(56) References Cited

U.S. PATENT DOCUMENTS

2002/0154879 A1* 10/2002 Yasuda ................ G02B 6/2804
385/132
2005/0180714 A1* 8/2005 Sano ........................ G02B 6/13
385/132

OTHER PUBLICATIONS

Written Opinion, dated Jan. 8, 2018, by ISA/CA, re PCT International Application No. PCT/IB2017/055443.

* cited by examiner

OPTICAL COUPLER WITH A WAVEGUIDE AND WAVEGUIDE INDEX MATCHED MATERIALS AT AN EDGE OF A SUBSTRATE

CROSS-REFERENCE TO RELATED APPLICATION(S)

This application claims priority from U.S. Provisional Patent Application No. 62/385,568, filed Sep. 9, 2016, which is incorporated herein by reference.

FIELD

The specification relates generally to telecommunication devices, and specifically to an optical coupler with a waveguide and waveguide index matched materials at an edge of a substrate.

BACKGROUND

Optical coupling into and out of waveguides in photonic integrated structures can have reduced efficiencies due to light leaking out of the waveguides at the edge of the structure interacting with oxides encapsulating the waveguide, as well as insulator layers between the waveguide and a substrate. The losses occur mainly due to differences in indices of refraction between the waveguide, the insulator layers and the encapsulating oxides; the losses can be particularly acute when silicon substrates are used.

SUMMARY

The present specification provides a device that includes a substrate with an opening formed adjacent to an edge, a layer of insulator (e.g. an oxide material, a thermal oxide material, a nitride material, and the like) that forms a bridge across the opening and a waveguide thereupon. Optical epoxy that is indexed matched to the insulator is located in the opening. Any encapsulating insulators and/or oxides and/or nitrides on at least a tapered region of the waveguide at the edge, are replaced with optical epoxy using, for example, etching techniques to remove the encapsulating insulators. The thicknesses of the optical epoxies are selected to contain optical signals leaking from the waveguide in the tapered region. Replacing the substrate and the encapsulating insulator adjacent to the tapered region with index matched epoxy can reduce the losses due to differences in refractive index between the insulator and the substrate, and between the insulator and the encapsulating insulator.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

Furthermore, as will become apparent, in this specification certain elements may be described as connected physically, electronically, or any combination thereof, according to context. In general, components that are electrically connected are configured to communicate (that is, they are capable of communicating) by way of electric signals. According to context, two components that are physically coupled and/or physically connected may behave as a single element. In some cases, physically connected elements may be integrally formed, e.g., part of a single-piece article that may share structures and materials. In other cases, physically connected elements may comprise discrete components that may be fastened together in any fashion. Physical connections may also include a combination of discrete components fastened together, and components fashioned as a single piece.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . ." and "one or more . . ." language.

The terms "about", "substantially", "essentially", "approximately", and the like, are defined as being "close to", for example as understood by persons of skill in the art. In some implementations, the terms are understood to be "within 10%," in other implementations, "within 5%", in yet further implementations, "within 1%", and in yet further implementations "within 0.5%".

An aspect of the specification provides a device comprising: a substrate having an edge, the substrate having an opening formed therein adjacent the edge; a layer of insulator on the substrate, the layer of insulator forming a bridge across the opening at the edge; a waveguide on the layer of insulator, the waveguide comprising a constant-width region and a tapered region terminating at the edge in a region of the opening, the tapered region having a smaller width at the edge than adjacent the constant-width region; a first layer of optical epoxy in the opening, the optical epoxy indexed matched to the layer of insulator; and, a second layer of the optical epoxy on the tapered region, such that the optical epoxy optically contains an optical signal leaking from the waveguide in the tapered region.

The opening can extend from the edge in a direction of the waveguide.

The opening can extend from the edge, in a direction of the waveguide, to an interface between the tapered region and the constant-width region.

The opening can comprise a trough that can extend from the edge in a direction of the waveguide.

The opening can have a depth that can extend from the layer of insulator to an underside of the substrate.

The opening can have a length that can extend into the substrate, and is in a range of about 50 microns to about 120 microns.

The opening can have a width that is in a range of about 20 microns to about 40 microns, and the opening can have a depth that is in a range of about 20 microns to about 40 microns.

The device can further comprise an encapsulating layer of insulator material on the layer of insulator, the encapsulating layer having a respective opening, the tapered region of the waveguide being in the respective opening, the second layer of the optical epoxy located in the respective opening. The encapsulating layer can comprise an oxide of a same material of the substrate and the layer of insulator, the encapsulating layer having an index of refraction different from the layer of insulator. The encapsulating layer can comprise a layer of plasma-enhanced chemical vapor deposition insulator material.

Each of the substrate and the waveguide can comprise silicon, and the insulator can comprise one or more of: an oxide material, a thermal oxide material, a silicon oxide, a thermal silicon oxide, a nitride material, and a silicon nitride material.

The first layer of the optical epoxy can be at least about 10 microns thick, and the second layer of the optical epoxy can be at least about 10 microns thick.

The layer of insulator can be at least about 2 microns thick.

Another aspect of the specification provides a method comprising: etching an opening in a substrate at least adjacent an edge of the substrate, the substrate having a layer of insulator thereupon, such that the layer of insulator forms a bridge across the opening at the edge; forming a waveguide on the layer of insulator, the waveguide comprising a constant-width region and a tapered region terminating at the edge in a region of the opening of the substrate, the tapered region having a smaller width at the edge than adjacent the constant-width region; forming a first layer of optical epoxy in the opening, the optical epoxy indexed matched to the layer of insulator; and, forming a second layer of the optical epoxy on the tapered region, such that the optical epoxy optically contains an optical signal leaking from the waveguide in the tapered region.

The substrate can comprise a silicon substrate, and the insulator can comprise one or more of: an oxide material, a thermal oxide material, a silicon oxide, a thermal silicon oxide, a nitride material, and a silicon nitride material.

The method can further comprise, after forming the waveguide: depositing an encapsulating layer of insulator material on the waveguide and the insulator; and, etching a respective opening in the encapsulating layer on a side opposite the opening in the substrate, wherein the second layer of the optical epoxy is in the respective opening. The substrate can comprise a silicon substrate, the insulator can comprise thermal silicon oxide, and the encapsulating layer can comprise silicon oxide. The encapsulating layer can be deposited using plasma-enhanced chemical vapor deposition.

The method can further comprise growing the layer of insulator on the substrate prior to the etching the opening in the substrate.

The substrate can comprise a silicon-on-insulator (SOI) substrate, and the forming the waveguide on the layer of the insulator can comprise etching a silicon layer of the SOI substrate.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
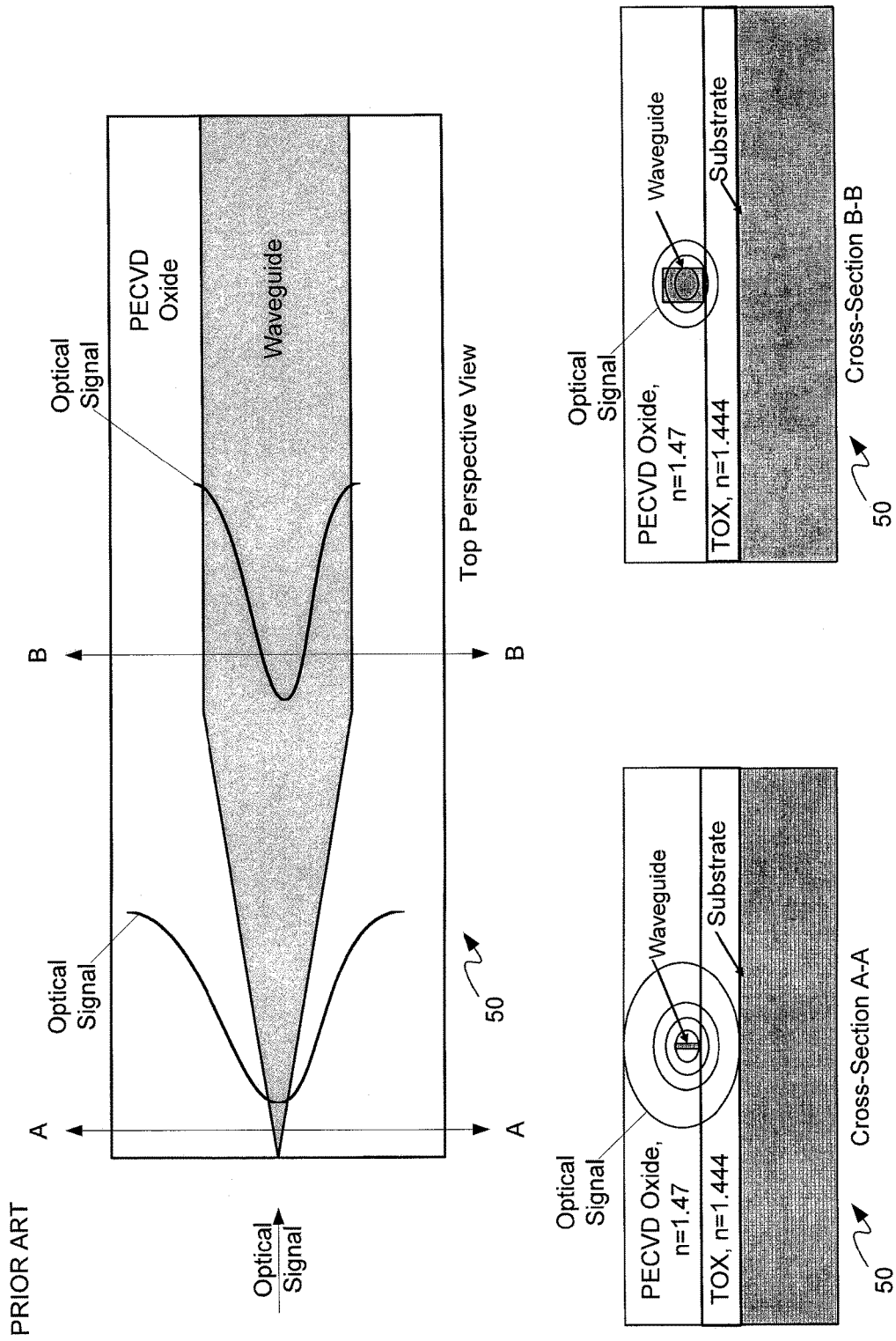
FIG. 1 depicts a top perspective view and cross-sectional views of a waveguide of a device according to the prior art.

FIG. 1 depicts a top perspective view and cross-sectional views of a waveguide of a device 50 according to the prior art. In particular, a waveguide on a thermal oxide, that is in turn located on a substrate, has a tapered region terminating at an edge of the substrate, and a constant-width region distal the edge. Cross-sections through each of line A-A and line B-B are also depicted, with the line A-A being through a portion of the tapered region of the waveguide adjacent the edge and the line B-B being through the constant-width region of the waveguide. In general, the thermal oxide, which can include a thermal oxide of the substrate material, is located between the waveguide and the substrate, and the waveguide is encapsulated by further oxide material formed, for example, using physical and/or chemical vapour deposition techniques. In some implementations, the waveguide and the substrate are formed from silicon and the oxides comprise silicon oxide. In general, there are differences in respective indices of refraction between the thermal oxide and the encapsulating oxide. For example, a thermal silicon oxide (TOX in FIG. 1) can have an index of refraction of about 1.444, while a plasma enhanced chemical vapour deposition (PECVD Oxide in FIG. 1) silicon oxide (e.g. $SiO_2$), which encapsulates the waveguide, and is located on the thermal silicon oxide, can have an index of refraction of about 1.46.

An optical signal (i.e. light) impinges upon the edge of the substrate, centred on the tip of the tapered region of the waveguide; the optical signal can be from a light source which can include, but is not limited to, an optical fiber, a butt-coupled fiber (e.g. an optical fiber) a laser and the like. When the light source includes an optical fiber, a butt-coupled fiber, and the like, it is assumed that the fiber is also coupled to a light source and is conveying an optical signal (e.g. light) from the light source to device 50. The waveguide can convey the optical signal to other optical devices (not depicted) on the substrate; indeed, while an end of the waveguide is depicted distal the tapered end, it is appreciated that the waveguide and/or device 50 can be larger than depicted and include such other optical devices. Hence device 50 comprises an optical coupler configured to convey the optical signal into device 50. It is further appreciated that device 50 can also operate in an output mode in which an optical signal from the waveguide is conveyed out of device 50 via the tip of the tapered region of the waveguide.

The optical signal received at the end is generally wider than the tapered region, but as the tapered region widens, the optical signal is coupled into the waveguide, as indicated by the optical signals shown in each of the tapered region and constant-width region; however, as a portion of the optical signal is in the PECVD Oxide and a portion of the optical signal is in the thermal oxide, the differences in index of refraction will lead to losses in the coupling, for example due to reflection at the interfaces between the oxides. Furthermore, when the optical signal leaks out of the thermal oxide, the optical signal can also interact with the substrate, leading to further losses and/or unwanted complexities in the coupling.

Figure 2:
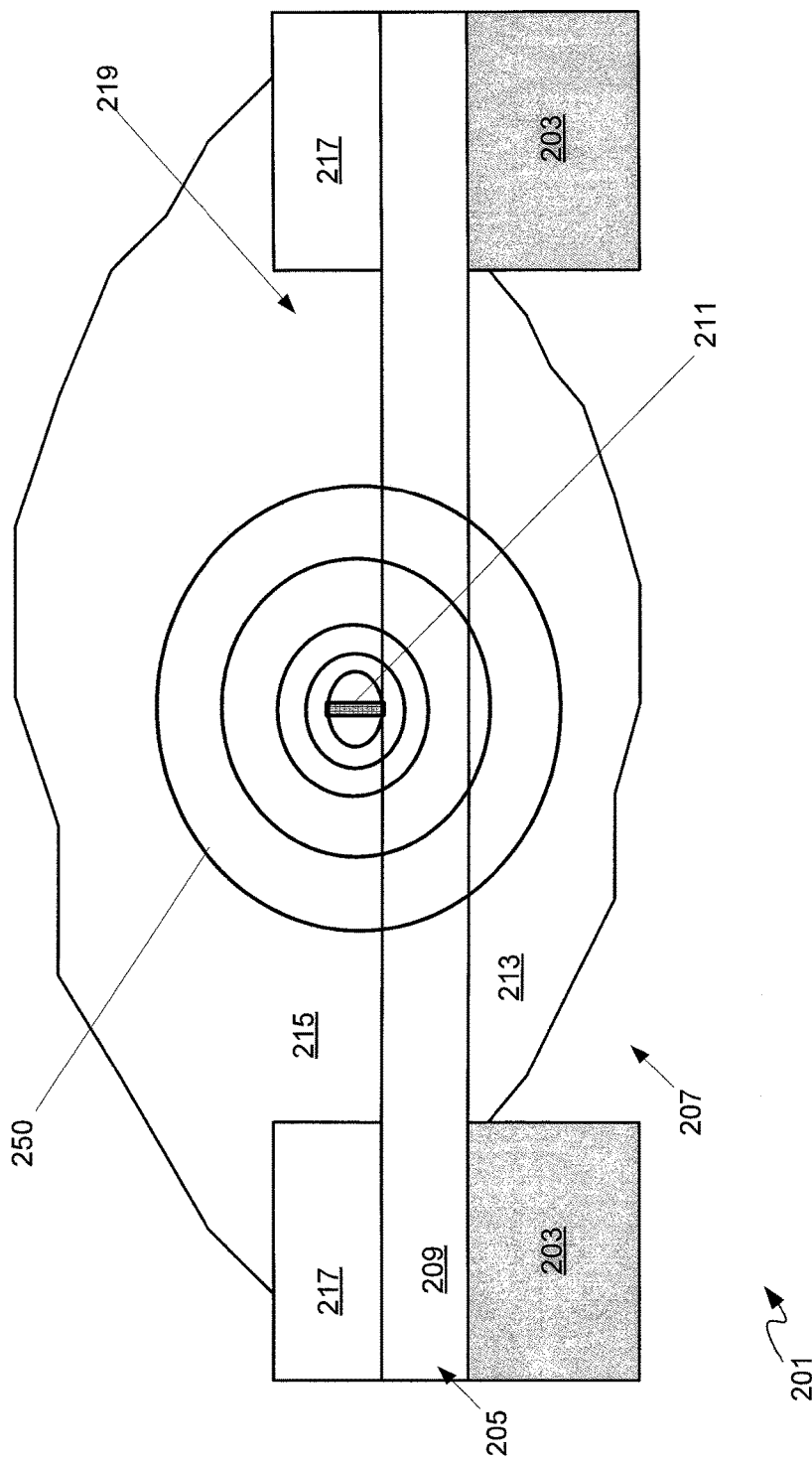
FIG. 2 depicts an end view of a device that includes an optical coupler with a waveguide and waveguide index matched materials at an edge of a substrate, according to non-limiting implementations.
Figure 3:
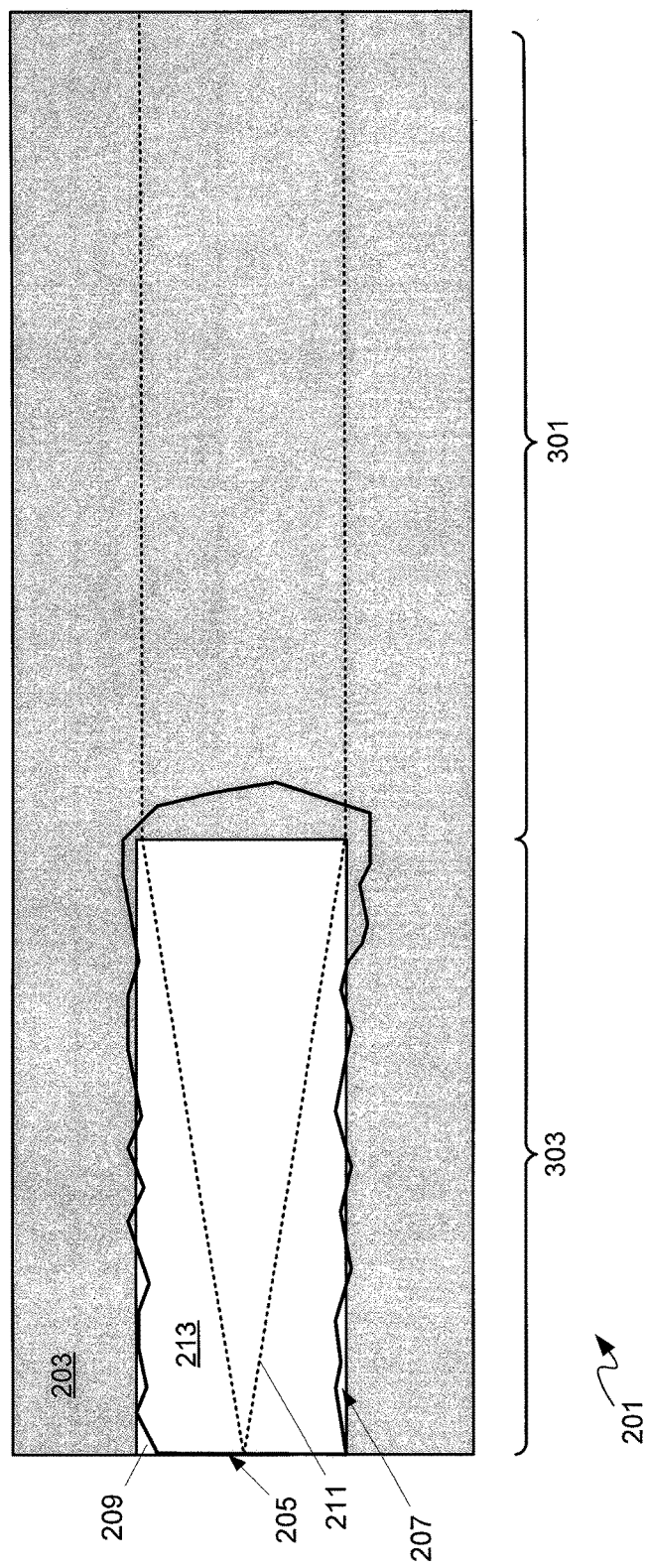
FIG. 3 depicts an underside view of the device of FIG. 2, with a waveguide on a device-side of the substrate depicted in outline, according to non-limiting implementations.
Figure 4:
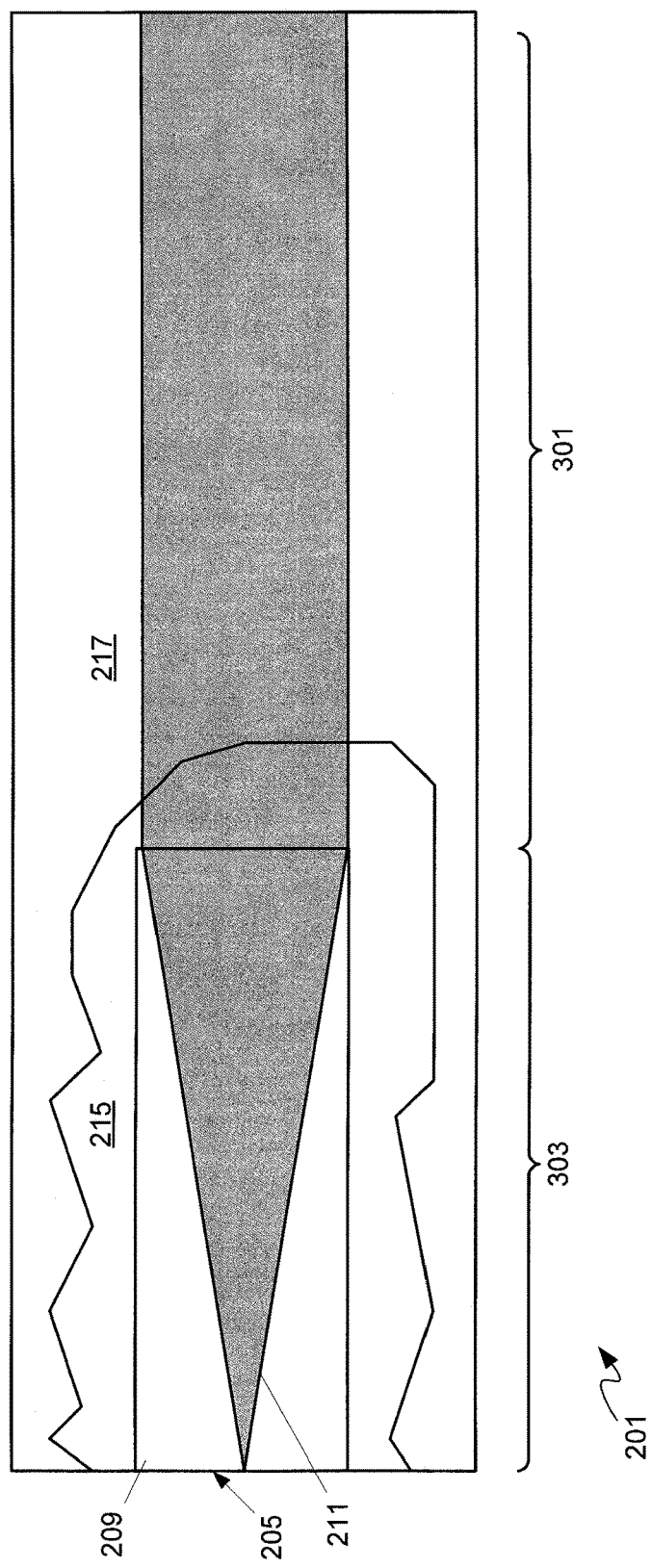
FIG. 4 depicts a device-side view of the device of FIG. 2, with a waveguide on a device-side of the substrate depicted in outline, according to non-limiting implementations.

Hence, attention is next directed to FIGS. 2, 3 and 4 which respectively depict an end view, an underside view and a device-side view of a device 201 that includes index-matched epoxy around a tapered region of a waveguide. In particular, device 201 comprises: a substrate 203 having an edge 205, substrate 203 having an opening 207 formed therein adjacent edge 205; a layer 209 of insulator on substrate 203, layer 209 of insulator forming a bridge across opening 207 at edge 205; a waveguide 211 on layer 209 of insulator, waveguide 211 comprising a constant-width region 301 and a tapered region 303 terminating at edge 205 in a region of opening 207, tapered region 303 having a smaller width at edge 205 than adjacent constant-width region 301; a first layer 213 of optical epoxy in opening 207, the optical epoxy indexed matched to layer 209 of insulator; and, a second layer 215 of the optical epoxy on tapered region 303, such that the optical epoxy optically contains an optical signal leaking from waveguide 211 in tapered region 303.

As depicted, device 201 further comprises an encapsulating layer 217 of insulator material on layer 209 of insulator, encapsulating layer 217 of insulator material having a respective opening 219, tapered region 303 of waveguide 211 being in respective opening 219, and second layer 215 of optical epoxy located in respective opening 219.

Also depicted in FIG. 2 are contours of an example optical signal 250, represented by ellipses centered on waveguide 211. In other words, while a light source is not depicted, device 201 can generally be positioned relative to a light source (e.g. an optical fiber, a butt-coupled fiber, a laser and the like) that generates optical signal 250, such that device 201 receives optical signal 250 therein via a tip of waveguide 211 located at edge 205 which is then conveyed into device 201. Hence device 201 comprises an optical coupler configured to convey optical signal 250 into device 201. Alternatively, device 201 can be used to output an optical signal from waveguide 211 out of device 201 via the tip of the waveguide 211 at edge 205; for example, an optical signal can be output to an optical fiber, a butt-coupled fiber, and the like. Hence, device 201 comprises an optical coupler that can be used as an input optical coupler and/or as an output optical coupler. While device 201 will be hereafter described as an input optical coupler, it is appreciated that device 201 can also be used as an output optical coupler, with behaviour of an output optical signal behaving similar to optical signal 250, but being output from device 201.

In general, optical signal 250 behaves similar to the optical signal depicted in FIG. 1, however optical signal 250 does not encounter optical interfaces as both layer 209 of insulator and layers 213, 215 of index matched optical epoxy contain optical signal 250.

In some implementations, layer 209 of insulator can comprise one or more of: an oxide material, a thermal oxide material, a silicon oxide, a thermal silicon oxide, a nitride material, and a silicon nitride material. Indeed, in general, layer 209 of insulator can comprise an optical insulator having optical properties similar to an optical epoxy, and the like, when cured, and hence layer 209 of insulator is generally transparent to optical signal 250. An insulator of layer 209 can be selected based on one or more of desired optical properties, available deposition techniques, available substrate materials, and the like. For example, device 201 can be formed starting with a Silicon-On-Insulator (SOI) substrate, and the type of insulator selected for layer 209 can depend on available SOI substrates.

In some implementations, layer 209 of insulator be at least about 2 microns thick, and/or layer 209 of insulator can be in a range of about 2 microns to about 3 microns, for example to maintain structural integrity across opening 207. The thickness of layer 209 of insulator can be controlled using thermal growth of oxides from substrate 203 (i.e. layer 209 of insulator can comprise a layer of thermal oxide). Indeed, in some implementations, an SOI substrate can be used as a starting point for fabricating device 201, and a thickness of layer 209 of insulator can be selected by selecting a suitable SOI substrate, with the silicon layer of the SOI substrate being used to form waveguide 211. Furthermore, while present implementations are described with respect to layer 209 comprising an oxide material, other insulating materials are within the scope of present implementations including, but not limited to, nitride materials (e.g. silicon nitride).

In some implementations, each of substrate 203 and waveguide 211 can comprise silicon, and the oxide of layer 209 can comprise a thermal silicon oxide, with layers 213, 215 index matched to the thermal silicon oxide. Hence, for example, layer 209 can have a given index of refraction, and an optical epoxy for layers 213, 215 is selected that also has an index of refraction similar to the given index of refraction of layer 209. Hence, material that surrounds at least tapered region 303 can have optical interfaces therein eliminated (and/or differences in index of refraction there between reduced), which can result in a deduction in losses in optical signal 250 being coupled into waveguide 211, and specifically the losses that are due to such optical interfaces. In general, the optical epoxy that is selected for use with device 201 can have an index of refraction that is within about 0.5% of the index of refraction of layer 209, though larger differences between indices of refraction the optical epoxy and layer 209 are within the scope of present implementations, though losses in optical signal 250 can increase as this difference increases.

Encapsulating layer 217 of insulator material, when present, can comprise an oxide of a same material of substrate 203 and layer 209 of insulator, encapsulating layer 217 of insulator material having an index of refraction different from layer 209 of insulator, similar to device 50 of FIG. 1. As such, encapsulating layer 217 of insulator material can comprise a layer of plasma-enhanced chemical vapor deposition insulator material. However, encapsulating layer 217 of insulator material can comprise one or more of: an oxide material, a thermal oxide material, a silicon oxide, a thermal silicon oxide, a nitride material, and a silicon nitride material. Indeed, in general, encapsulating layer 217 of insulator material can comprise an optical insulator having optical properties similar to an optical epoxy, and the like, when cured, and hence encapsulating layer 217 of insulator material is generally transparent to optical signal 250, similar to layer 209. An insulator material of encapsulating layer 217 can be selected based on one or more of desired optical properties, available deposition techniques, and the properties and/or materials of layer 209, and the like.

Opening 207, as used herein, generally refers to an absence of material at an underside of substrate 203 and hence the term "opening" can interchangeably be used with one or more of gap, cavity, indentation, hollow, slot, dent, depression, recess, and the like. Regardless, after layer 209 of insulator is formed, a portion of substrate 203 is removed from a side opposite waveguide 211 to form opening 207 leaving layer 209 of insulator forming a bridge across opening 207.

For example, as best seen in FIG. 3, opening 207 can comprise one or more of a slot and/or trough in substrate 203. However, opening 207 need not extend from layer 209 of insulator through substrate 203, but can alternatively comprise a hole, and abscess and the like that extends into substrate 203 from edge 205 with a layer of substrate material (not depicted) bridging opening 207 on a side opposite layer 209 of insulator.

By controlling, for example, etching times, locations of photolithographic layers and the like, dimensions and/or a configuration of opening 207 can be selected.

Furthermore, the term "underside", as used herein, refers to a side of substrate 203 that is opposite a device-side of substrate 203, the device-side of substrate 203 comprising a side of substrate 203 where waveguide 211 is located (e.g. as in FIG. 4), as well as any associated devices. For example, while not depicted, device 201 can comprise further optical devices coupled to waveguide 211, and waveguide 211 guides optical signal 250 to such devices. Indeed, while each of FIGS. 3 and 4 show device 201 and waveguide 211 terminating at an edge opposite edge 205, each of device 201 and waveguide 211 can be extended and/or modified to included such devices. As well, device 201 need not be rectangular as depicted, but can be any shape compatible with such devices.

For example, device 201 can be components of a transmitter in an optical telecommunications system (e.g. an optical telecommunication transmitter) configured to produce, and transmit, modulated optical signals and/or multiplexed optical signals at one or more given optical frequencies, and one or more given data rates, the modulated optical signals having data encoded therein. As such, device 201 can further comprise further waveguides, optical modulators (including, but not limited to, optical ring resonators) and the like, as well as optical coupling devices that convey such optical signals to one or more optical transmission lines, such as optical fibres. For example, device 201 can comprise a photonic integrated circuit that includes modulating devices and/or optical busses, including waveguide 211. As such, the one or more given optical frequencies of optical signal 250 can comprise one or more given carrier optical frequencies including, but not limited to, optical frequencies used in optical telecommunications in a range of about 184.5-238 THz; however other optical frequencies are within the scope of present implementations. Furthermore, device 201 can convey an optical signal from tip of waveguide 211 to optical components, and/or device 201 can convey an optical signal from such optical components to tip of waveguide 211 (i.e. to other optical components); hence, device 201 can be used as an input coupler and/or as an output coupler.

As such, dimensions and/or configurations of waveguide 211 can be selected for compatibility with such frequencies and light sources that produce optical signals of such frequencies. Similarly, as will be described hereafter, dimensions and/or configurations of openings 207, 219 can be adapted accordingly and/or selected for compatibility with both waveguide 211 and optical signal 250 (whether optical signal 250 is being received as input or being transmitted as output).

In particular, each opening 207, 219 extends from edge 205 in a direction of waveguide 211. For example, as best seen in FIGS. 3 and 4, each opening 207, 219 extends from edge 205, in a direction of waveguide 211, to an interface between tapered region 303 and constant-width region 301 (e.g. where tapered region 303 meets constant-width region 301). As best seen in FIGS. 2 and 3, opening 207 can comprise a trough that extends from edge 205 in a direction of waveguide 211, with a depth that extends from layer 209 of insulator to an underside of substrate 203: e.g. opening 207 has been etched in substrate 203 in a trough shape. However, as described above, opening 207 need not extend through to an underside of substrate 203.

Furthermore, as best seen in FIG. 4, opening 219 can also comprise a trough that extends from edge 205 in a direction of waveguide 211; indeed, as depicted, opening 219 has been etched in encapsulating layer 217 in a trough shape. However, opening 219 need not be a trough shape; rather, opening 219 can comprise a step that extends from about the interface between tapered region 303 and constant-width region 301 to edge 205 (e.g. across a width of substrate 203 and/or well outside tapered region 303). For example, encapsulating layer 217 can be deposited onto constant-width region 301, but not tapered region 303 and/or not along edge 205.

Dimensions of waveguide 211 are generally selected for compatibility with optical telecommunication frequencies, and hence dimensions of opening 207 are similarly selected. As such, opening 207 can have a length that extends along waveguide 211 in a range of about 50 microns to about 120 microns. In other words, tapered region 303 can have a length in a range of about 50 microns to about 120 microns and opening 207 can have a similar length and/or be slightly longer, for example about 10% longer. Indeed, opening 207 can extend into an area of constant-width region 301.

Similarly, opening 207 can have a width in a range of about 20 microns to about 40 microns: in other words, tapered region 303 can have a largest width (e.g. where tapered region 303 interfaces with constant-width region 301) in a range of about 20 microns to about 40 microns and opening 207 can have a similar width and/or a width of opening 207 can be larger than a largest width of tapered region 303. As such constant-width region 301 can have a width in a range of about 20 microns to about 40 microns and opening 207 can have a similar width and/or be larger than a width of constant-width region 301.

Similarly, opening 207 can have a depth that is in a range of about 20 microns to about 40 microns and/or opening 207 can have a depth that is similar to a thickness of substrate 203.

Indeed, dimensions of opening 207 are selected to be larger than dimensions of leakage of optical signal 250 into layer 213 and/or dimensions of opening 207 are selected to contain leakage of optical signal 250 in layer 213 (e.g. regardless of whether optical signal 250 is being received as input (as depicted) or being transmitted as output).

Opening 219 can have a similar length and width as opening 207, however a depth of opening 219 can be similar to a thickness of encapsulating layer 217 of insulator material. Furthermore, openings 207, 219 can have different dimensions as long as optical signal 250 is contained in the optical epoxy.

Furthermore, while each of openings 207, 219 are described as having regular and/or rectangular dimensions (e.g. with straight, perpendicular sides), dimensions of each of opening 207, 219 can be irregular. Indeed, dimensions of each of openings 207, 219 need not be tightly controlled as long as the dimensions are larger than a cross-sectional area of optical signal 250 and/or optical signal 250 is contained in the optical epoxy.

Furthermore, as understood from FIG. 1, as an optical signal is conveyed along a tapered region of a waveguide to a constant-width region, more of the optical signal is coupled into the waveguide. Hence, each of openings 207, 219 can also become narrower closer to the interface between tapered region 303 and constant-width region 301.

In any event, once openings, 207, 219 are formed, an optical epoxy that is index matched to layer 209 of insulator can be applied to device 201 for example using an epoxy dispensing device.

Each of openings 207, 219 can be filled with optical epoxy in the form of layers 213, 215, however each of openings 207, 219 need not be completely filled with the optical epoxy, as long as optical signal 250 is contained in the optical epoxy. Indeed, as best seen in FIGS. 3 and 4, layers 213, 215 of optical epoxy can be irregular along the sides of openings 207, 219; and, as also seen in FIG. 2, can extend past the sides of openings 207, 219 and/or can be contained by the sides of openings 207, 219. Either way, the optical epoxy need not be regular and need not fill openings 207, 219.

Alternatively, in some implementations, the optical epoxy can effectively encapsulate tapered region 303. In particular, when a butt-coupled fiber is used to interface with device 201, the optical epoxy can be sandwiched between an end of the fiber and the tip of waveguide 211, to index match the fiber to waveguide 211 with no air gaps, the optical epoxy also entering and at least partially filling openings 207, 219 and/or at least partially encapsulating tapered region 303. Furthermore, the optical epoxy can wrap around edge 205.

A thickness of each layers 213, 215 can be selected to contain optical signal 250. For example, each of layer 213, 215 of the optical epoxy can be on the order of tens of microns thick, however other thicknesses of layers 213, 215 are within the scope of present implementations. In particular, a thickness of layers 213, 215 can depends on an optical beam spot size (e.g. a mode) of optical signal 250 at edge 205 and/or at the tip of waveguide 211; for example, a thickness of layers 213, 215 at edge 205 can each be at least about 10 microns thick when an optical beam spot size (e.g. a mode) of optical signal 250 at edge 205 and/or at the tip of waveguide 211 about 5 microns in diameter; similarly, a thickness of layers 213, 215 at edge 205 can each be at least about 20 microns thick when an optical beam spot size (e.g. a mode) of optical signal 250 at edge 205 and/or at the tip of waveguide 211 about 10 microns in diameter. In general, a thickness of layer 213, 215 of the optical epoxy can be any thickness that contains optical signal 250 therein.

Figure 5:
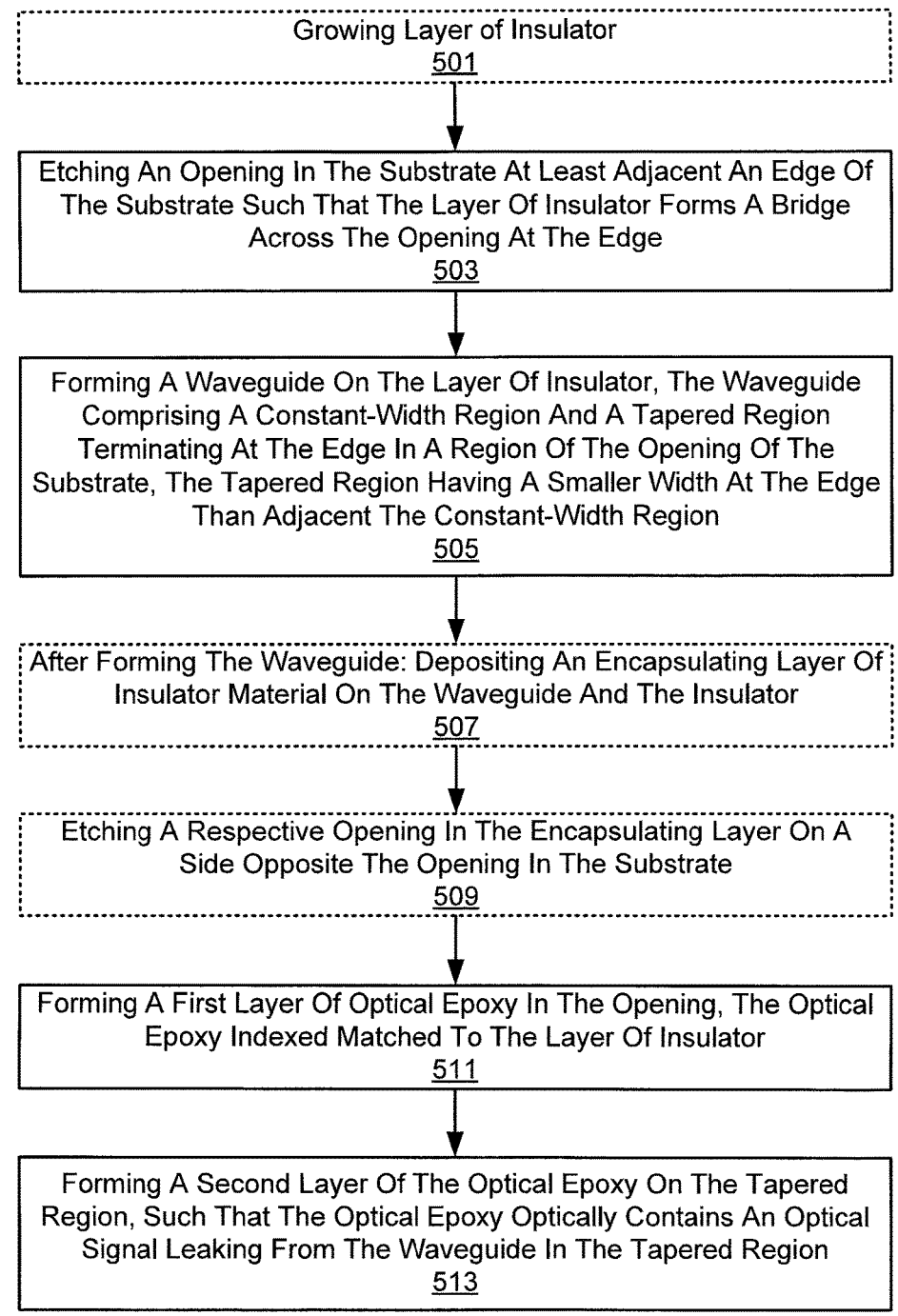
FIG. 5 depicts a block diagram of a method of forming a device that includes an optical coupler with a waveguide and waveguide index matched materials at an edge of a substrate, according to non-limiting implementations.

Attention is next directed to FIG. 5, which depicts a method of fabricating device 201. In order to assist in the explanation of method 500, it will be assumed that method 500 is performed using one or more systems for fabricating photonic integrated structures including, but not limited to, physical vapour deposition systems, chemical vapour deposition systems (including, but not limited to, PECVD systems), a combination thereof, photolithographic systems, etching systems, and the like. Furthermore, the following discussion of method 500 will lead to a further understanding of device 201, and its various components. However, it is to be understood that device 201 and/or method 500 can be varied, and need not work exactly as discussed herein in conjunction with each other, and that such variations are within the scope of present implementations.

Regardless, it is to be emphasized, that method 500 need not be performed in the exact sequence as shown, unless otherwise indicated; and likewise various blocks may be performed in parallel rather than in sequence; hence the elements of method 500 are referred to herein as "blocks" rather than "steps". It is also to be understood, however, that method 500 can be implemented on variations of device 201 as well.

At an optional block 501 (as indicated by block 501 being outlined in stippled lines), layer 209 of insulator is grown on substrate 203, for example by exposing substrate 203 to temperatures where a thermal insulator and/or a thermal oxide forms. Alternatively, an oxide and/or a nitride material can be deposited on substrate 203 using any suitable deposition technique. Alternatively, substrate 203 can comprise an SOI substrate such that, prior to commencing method 500, substrate 203 comprises layer 209 of insulator, as well as a layer of silicon from which waveguide 211 can be formed.

At block 503, opening 207 is etched in substrate 203 at least adjacent edge 205 of substrate 203 such that layer 209 of insulator (e.g. an oxide and/or a nitride) forms a bridge across opening 207 at edge 205. For example, photolithographic techniques and etching techniques can be used to form opening 207 to dimensions as described above.

At block 505, waveguide 211 is formed on layer 209 of insulator, waveguide 211 comprising constant-width region 301 and tapered region 303 terminating at edge 205 in a region of opening 207 of substrate 203, tapered region 303 having a smaller width at edge 205 than adjacent constant-width region 301. Processes for forming waveguides are used, including, but not limited to, physical vapour deposition processes, chemical vapour deposition processes, a combination thereof, photolithographic processes, etching processes, and the like. As described above, in some implementations, substrate 203 can comprise an SOI substrate and block 505 can comprise etching waveguide 211 from an existing layer of silicon on layer 209 of insulator.

At an optional block 507 (as indicated by block 507 being outlined in stippled lines), after forming waveguide 211: encapsulating layer 217 of insulator material is deposited on waveguide 211 and layer 209 of insulator, for example using plasma-enhanced chemical vapour deposition (PECVD) and the like (e.g. as well as any other depositions and photolithography steps which can be used to mask and protect a remainder of the device, for example to leave an opening just in a tapered waveguide region for selective etching processes used to deposit a PECVD insulator). And, when block 507 is implemented, at an additional optical block 509, respective opening 219 is etched in encapsulating layer 217 of insulator material on a side opposite opening 207 in substrate 203. Alternatively, waveguide 211 is encapsulated by encapsulating layer 217 of insulator material in constant-width region 301 but not in tapered region 303. In other words, encapsulating layer 217 can be deposited, with tapered region 303 being masked, in which case block 507 is not implemented.

At block 511, first layer 213 of optical epoxy is formed in opening 207, the optical epoxy indexed matched to layer 209 of insulator. At block 513, second layer 215 of optical epoxy is formed on tapered region 303, such that the optical epoxy optically contains an optical signal leaking from waveguide 211 in tapered region 303. Any process for forming layers 213, 215 of optical epoxy is within the scope of present implementations, including epoxy dispensing processes. Indeed, in some implementations, the optical epoxy can effectively encapsulate tapered region 303.

When opening 219 is formed, second layer 215 of optical epoxy is in respective opening 219. When waveguide 211 is encapsulated by encapsulating layer 217 of insulator material in constant-width region 301, but not in tapered region 303, second layer 215 of optical epoxy is formed over tapered region 303.

Figure 6:
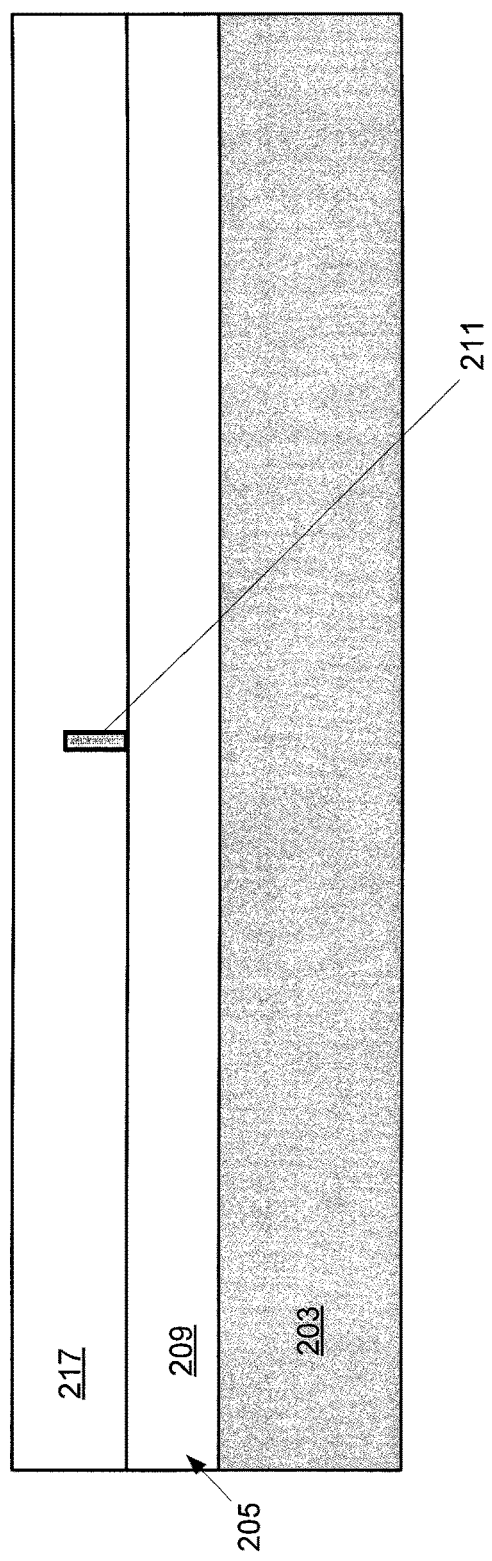
FIG. 6 depicts a portion of the method of FIG. 5, according to non-limiting implementations.
Figure 7:
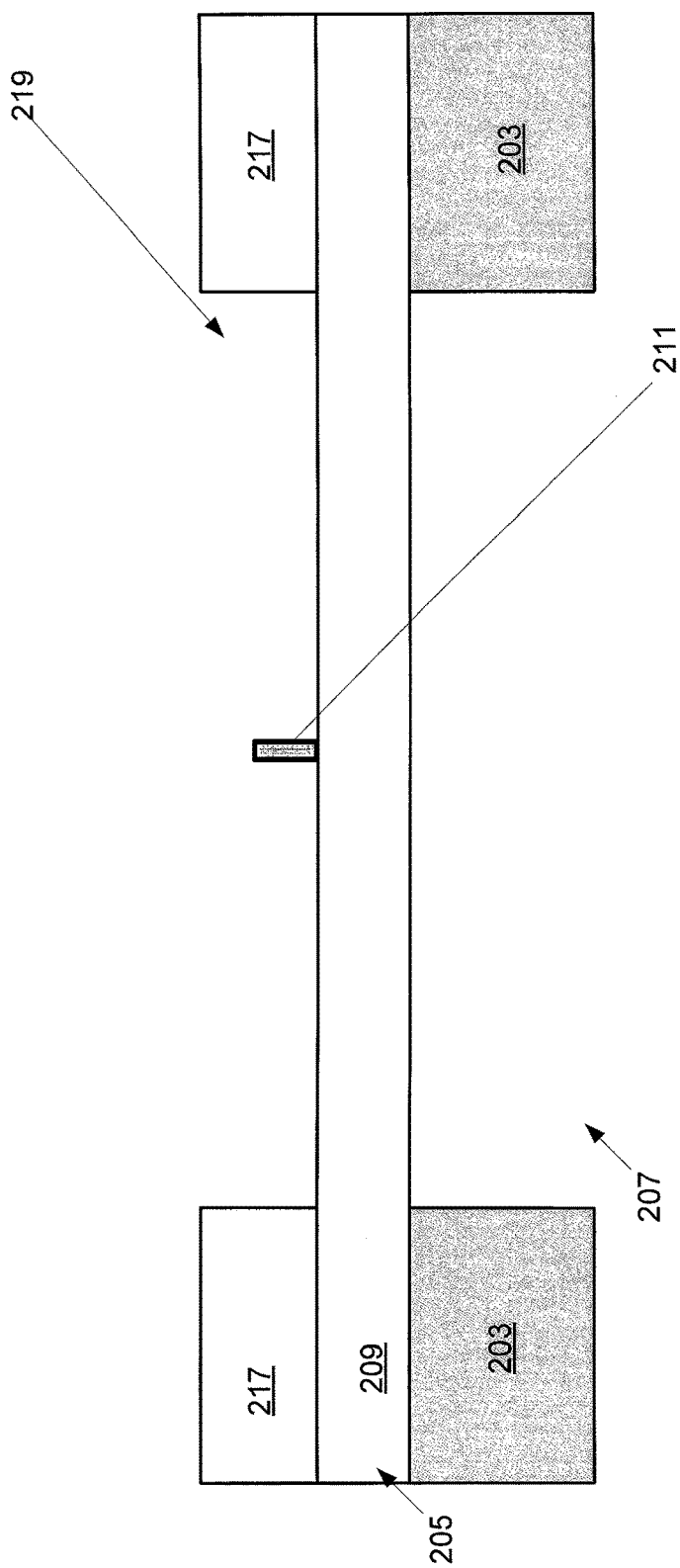
FIG. 7 depicts a further portion of the method of FIG. 5, according to non-limiting implementations.
Figure 8:
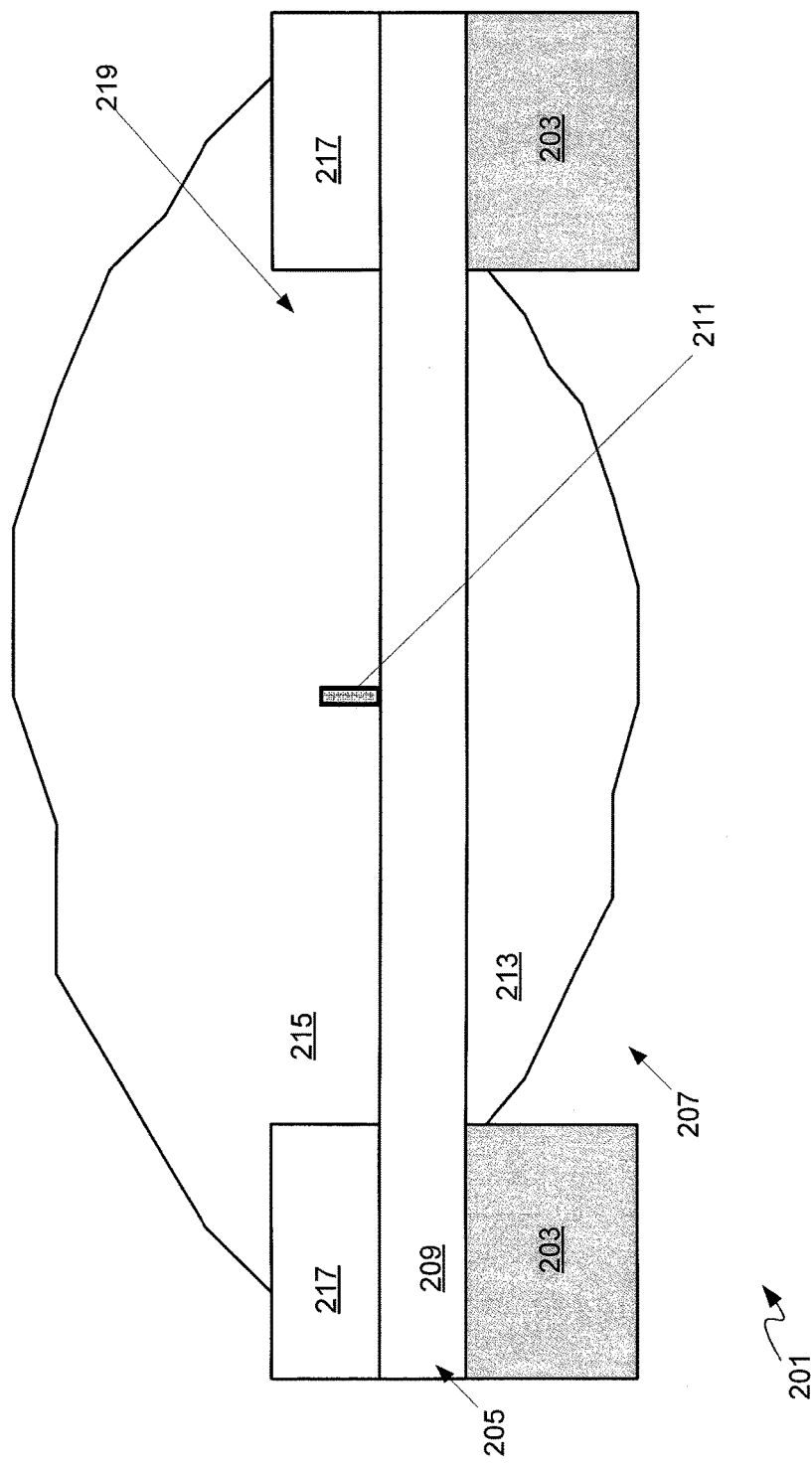
FIG. 8 depicts a device formed by the method of FIG. 5, according to non-limiting implementations.

Attention is next directed to FIGS. 6 through 8 which depict various stages of method 500 and/or various stages of the fabrication of device 201. For example, FIG. 6 depicts an end view of edge 205 of substrate 203 after blocks 501, and 505 to 507 of method 500 have been implemented, such that layer 209 of insulator (such as an oxide, a thermal oxide, a nitride and the like) has been grown on substrate 203 (and/or has been provided using an SOI substrate), waveguide 211 has been formed on layer 209 of the insulator, and the waveguide 211 has been encapsulated by encapsulating layer 217 of insulator material. In particular, FIG. 6 also shows that deposition of both of layers 209, 217 can occur prior to etching of openings 207, 219. However, in alternative implementations, etching of opening 207 can occur prior to deposition of encapsulating layer 217.

Attention is next directed to FIG. 7, which depicts an end view of edge 205 of substrate 203 after blocks 503 and 509 of method 500 have been implemented, such that openings 207, 219 have been etched in respective layers 213, 217, which can occur in any order.

Finally, attention is next directed to FIG. 8, which depicts an end view of edge 205 of substrate 203 after blocks 511 and 513 of method 500 have been implemented, and layers 213, 215 of optical epoxy are in openings 207, 219. Indeed, in FIG. 8 device 201 has been formed, and FIG. 8 is similar to FIG. 2, however optical signal 250 is not depicted in FIG. 8.

In any event, described herein is a device which includes an optical coupler with optical epoxy encapsulating at least a tapered region of a waveguide, the optical epoxy index matched to an insulator which supports the tapered region of the waveguide to eliminate (and/or reduce differences in indices of refraction of) optical interfaces there between. In particular, areas of the substrate and any encapsulating insulator adjacent to a tapered region of the waveguide are replaced with index matched epoxy which can reduce losses in optical signal coupling to the waveguide due to differences in refractive index between the insulator and the substrate, and between the insulator and the encapsulating insulator.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A device comprising:
   a substrate having an edge, the substrate having an opening formed therein adjacent the edge;
   a layer of insulator on the substrate, the layer of insulator forming a bridge across the opening at the edge;
   a waveguide on the layer of insulator, the waveguide comprising a constant-width region and a tapered region terminating at the edge in a region of the opening, the tapered region having a smaller width at the edge than adjacent the constant-width region;
   a first layer of optical epoxy in the opening, the optical epoxy indexed matched to the layer of insulator; and,
   a second layer of the optical epoxy on the tapered region, such that the optical epoxy optically contains an optical signal leaking from the waveguide in the tapered region.

2. The device of claim 1, wherein the opening extends from the edge in a direction of the waveguide.

3. The device of claim 1, wherein the opening extends from the edge, in a direction of the waveguide, to an interface between the tapered region and the constant-width region.

4. The device of claim 1, wherein the opening comprises a trough that extends from the edge in a direction of the waveguide.

5. The device of claim 1, wherein the opening has a depth that extends from the layer of insulator to an underside of the substrate.

6. The device of claim 1, wherein the opening has a length that extends into the substrate, and is in a range of about 50 microns to about 120 microns.

7. The device of claim 1, wherein the opening has a width that is in a range of about 20 microns to about 40 microns, and the opening has a depth that is in a range of about 20 microns to about 40 microns.

8. The device of claim 1, further comprising an encapsulating layer of insulator material on the layer of insulator, the encapsulating layer having a respective opening, the tapered region of the waveguide being in the respective opening, the second layer of the optical epoxy located in the respective opening.

9. The device of claim 8, wherein the encapsulating layer comprises an oxide of a same material of the substrate and the layer of insulator, the encapsulating layer having an index of refraction different from the layer of insulator.

10. The device of claim 8, wherein the encapsulating layer comprises a layer of plasma-enhanced chemical vapor deposition insulator material.

11. The device of claim 1, wherein each of the substrate and the waveguide comprises silicon, and the insulator comprises one or more of: an oxide material, a thermal oxide material, a silicon oxide, a thermal silicon oxide, a nitride material, and a silicon nitride material.

12. The device of claim 1, wherein the first layer of the optical epoxy is at least about 10 microns thick, and the second layer of the optical epoxy is at least about 10 microns thick.

13. The device of claim 1, wherein the layer of insulator is at least about 2 microns thick.

14. A method comprising:
    etching an opening in a substrate at least adjacent an edge of the substrate, the substrate having a layer of insulator thereupon, such that the layer of insulator forms a bridge across the opening at the edge;
    forming a waveguide on the layer of insulator, the waveguide comprising a constant-width region and a tapered region terminating at the edge in a region of the opening of the substrate, the tapered region having a smaller width at the edge than adjacent the constant-width region;
    forming a first layer of optical epoxy in the opening, the optical epoxy indexed matched to the layer of insulator; and,
    forming a second layer of the optical epoxy on the tapered region, such that the optical epoxy optically contains an optical signal leaking from the waveguide in the tapered region.

15. The method of claim 14, wherein the substrate comprises a silicon substrate, and the insulator comprises one or more of: an oxide material, a thermal oxide material, a silicon oxide, a thermal silicon oxide, a nitride material, and a silicon nitride material.

16. The method of claim 14, further comprising, after forming the waveguide: depositing an encapsulating layer of insulator material on the waveguide and the insulator; and, etching a respective opening in the encapsulating layer on a side opposite the opening in the substrate, wherein the second layer of the optical epoxy is in the respective opening.

17. The method of claim 16, wherein the substrate comprises a silicon substrate, the insulator comprises thermal silicon oxide, and the encapsulating layer comprises silicon oxide.

18. The method of claim 16, wherein the encapsulating layer is deposited using plasma-enhanced chemical vapor deposition.

19. The method of claim 14, further comprising growing the layer of insulator on the substrate prior to the etching the opening in the substrate.

20. The method of claim 14, wherein the substrate comprises a silicon-on-insulator (SOI) substrate, and the forming the waveguide on the layer of the insulator comprises etching a silicon layer of the SOI substrate.

* * * * *